Jan. 9, 1968  J. N. McELROY  3,362,664
PARACHUTE CONTROL SYSTEM
Filed Dec. 17, 1965  4 Sheets-Sheet 1
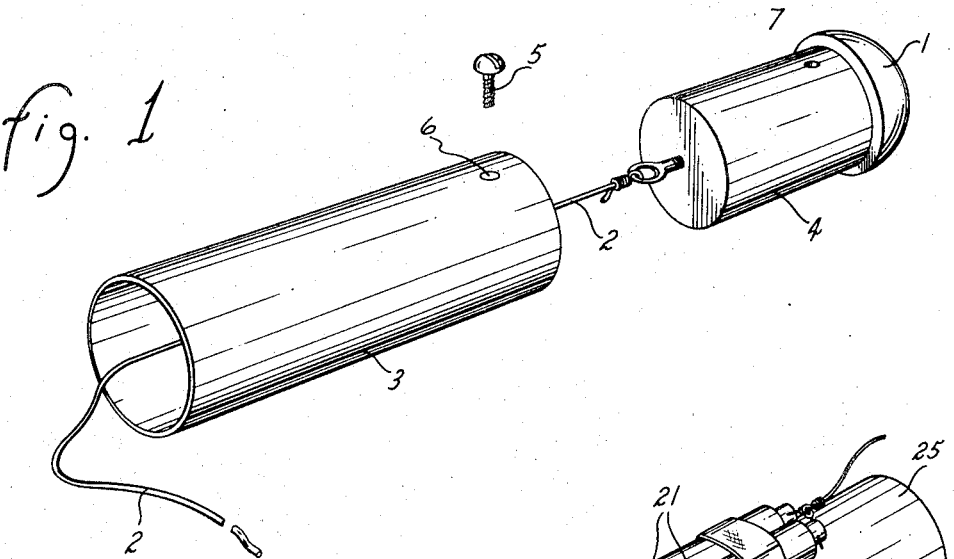
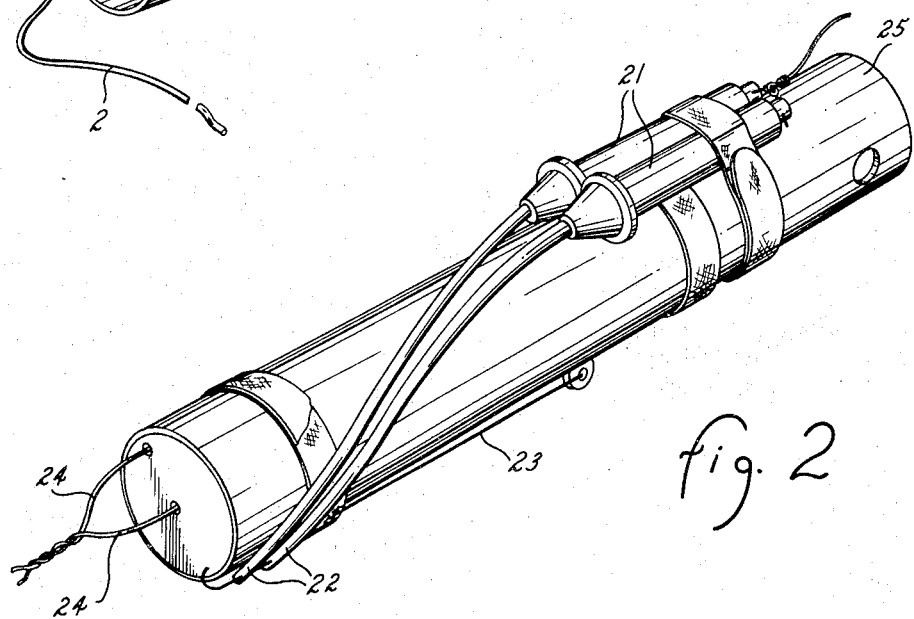
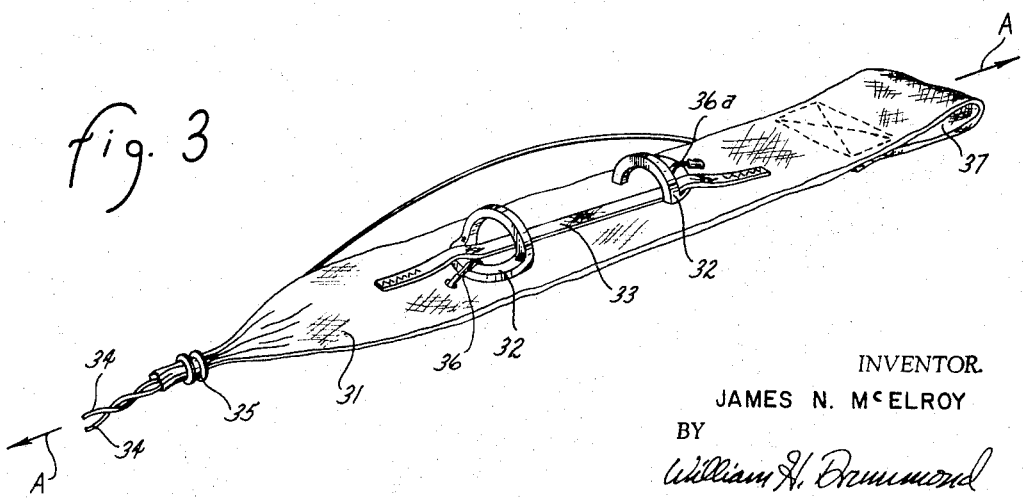
INVENTOR.
JAMES N. McELROY
BY
William H. Drummond
ATTORNEY Jan. 9, 1968   J. N. McELROY   3,362,664
PARACHUTE CONTROL SYSTEM
Filed Dec. 17, 1965   4 Sheets-Sheet 2
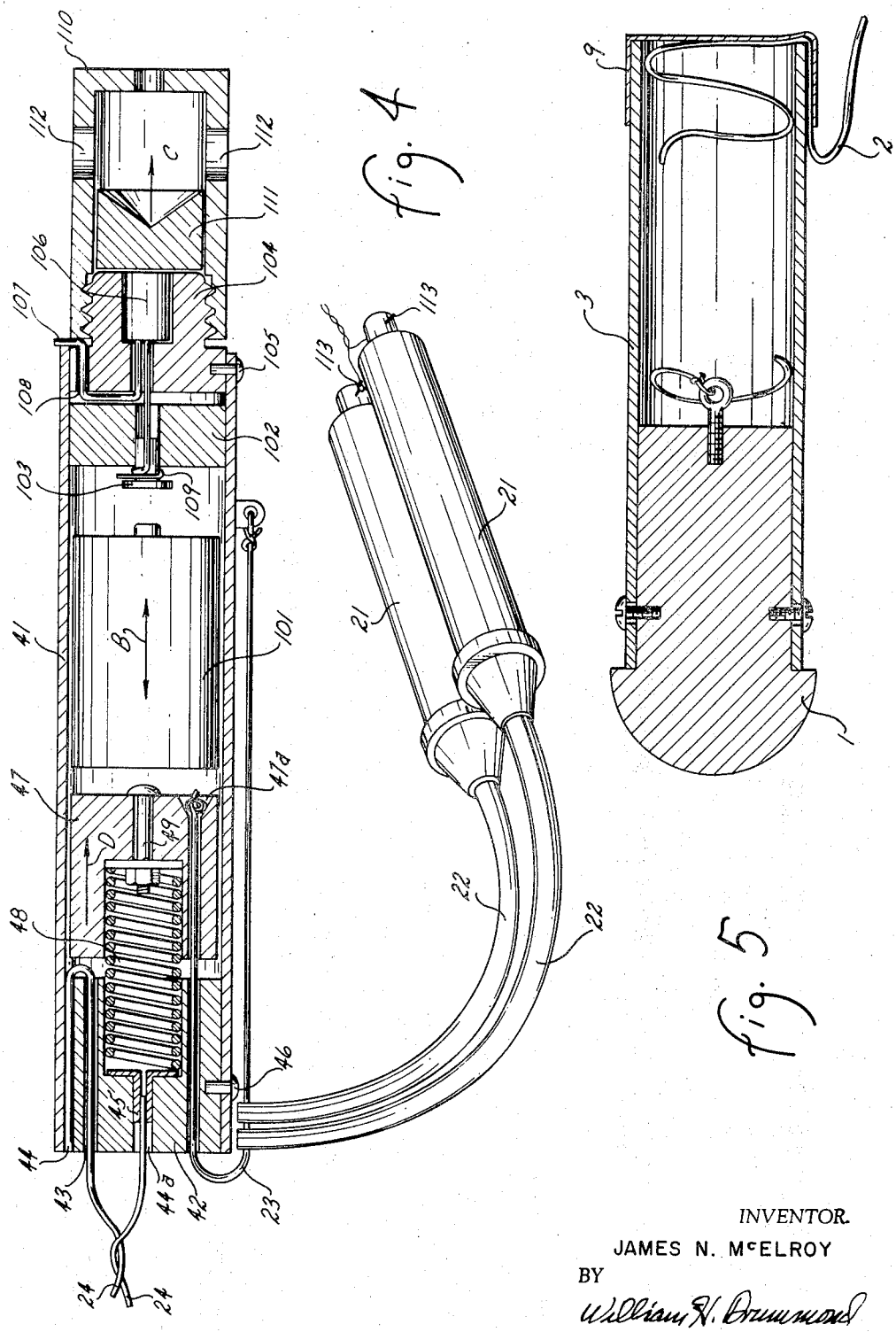
INVENTOR.
JAMES N. McELROY
BY
William H. Drummond
ATTORNEY

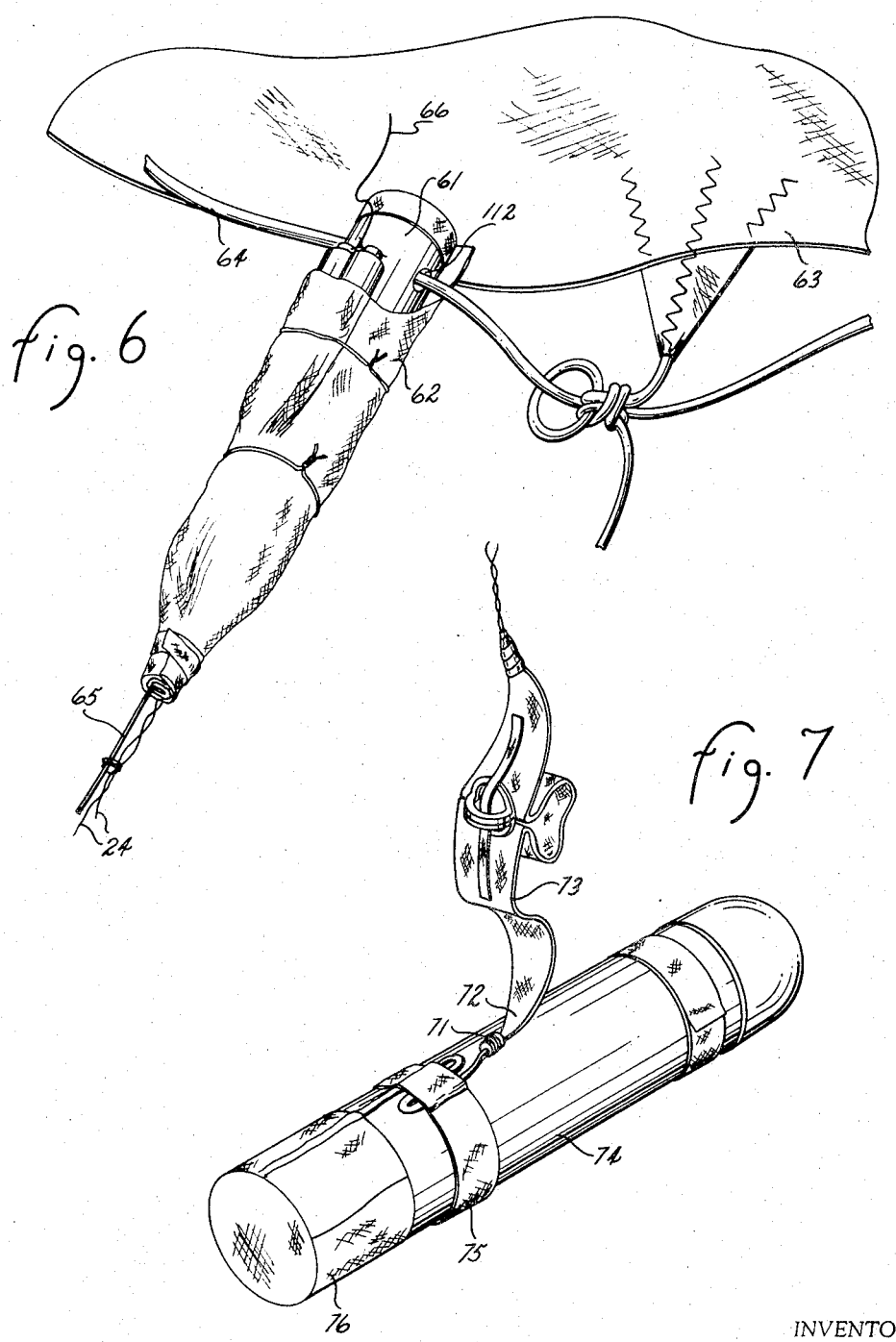

Jan. 9, 1968 J. N. McELROY 3,362,664
PARACHUTE CONTROL SYSTEM
Filed Dec. 17, 1965 4 Sheets-Sheet 4
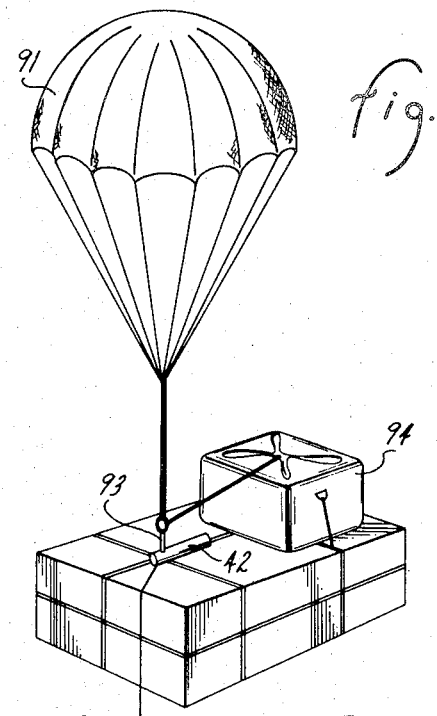
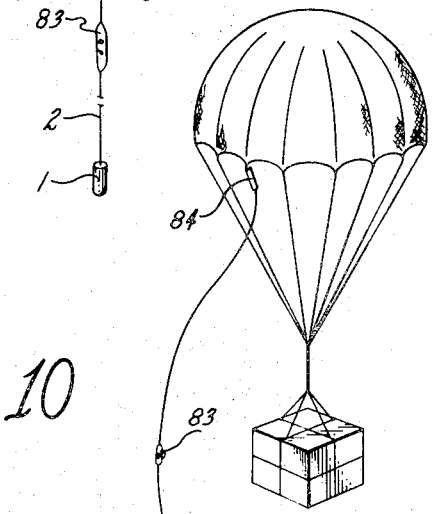
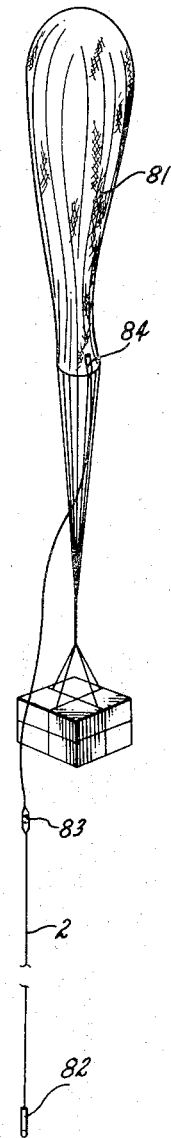
INVENTOR.
JAMES N. McELROY
BY
*William H. Drummond*
ATTORNEY

United States Patent Office

3,362,664
Patented Jan. 9, 1968

3,362,664
PARACHUTE CONTROL SYSTEM
James N. McElroy, Tucson, Ariz., assignor to Intermountain Aviation, Inc., a corporation of Arizona
Filed Dec. 17, 1965, Ser. No. 514,615
6 Claims. (Cl. 244—138)

ABSTRACT OF THE DISCLOSURE

An apparatus for opening a cargo parachute at a predetermined relatively low distance above the drop zone terrain. A drop cord suspended from the cargo is held under tension by a weight at the bottom of the cord. When the weight contacts the ground, tension in the cord is released, closing a tension-sensitive electrical switch which fires a parachute release device. The device is armed after being ejected from the cargo aircraft by a pyrotechnic time delay fuse.

---

This invention concerns apparatus for controlling the rate of descent of cargo-bearing parachutes. In a particular aspect, the invention concerns novel apparatus for deploying a parachute at a predetermined, relatively low distance above the drop-zone terrain. In a further aspect, the invention concerns a novel tension-sensitive switch of simple and rugged construction. In a still further aspect, the invention concerns a novel time-delay arming switch, also of simple and rugged construction.

In military, disaster relief and other similar operations, it is often required that cargo be parachuted from aircraft into rugged, often inaccessible terrain. In many cases, the drop zone is relatively small and the drop must be accomplished with considerable accuracy to prevent loss of the cargo. As a means of increasing the drop accuracy, it is generally desired that the cargo descend as far as possible in an essentially free-fall condition and that the parachute open only a very short distance, say upwards of 150 feet, above the drop-zone terrain. In this manner, the effects of wind drift are minimized. According to one such technique, only a small pilot chute is deployed when the load is dropped from the aircraft and, upon an appropriate signal, the pilot chute pulls the main chute from its pack and the main chute is then fully deployed. According to another technique, a somewhat larger "stabilizing" chute is deployed soon after the cargo is dropped in order to prevent the load from tumbling during its descent and the main chute is deployed only very shortly before impact. According to still another technique, the main chute is partially deployed soon after the cargo is dropped from the aircraft but full deployment is prevented by a so-called "reef line" which gathers the skirt of the main chute, preventing full deployment until, at an appropriate time, the reef line is cut or otherwise released, allowing the main chute to become fully inflated.

Various barometrically operated devices have been proposed to actuate the release for full deployment of the main chute but these devices are not fully satisfactory for general use because the exact altitude of the drop-zone terrain is generally not accurately known. In order to provide a safety margin, such barometrically operated devices must be set to deploy or fully open the main chute at an altitude above the drop-zone terrain which is undesirably high. Furthermore, such barometric devices are generally expensive and of somewhat reduced reliability.

It would be highly advantageous to provide a device for opening or deploying the main parachute at a predetermined, relatively very low distance above the drop-zone terrain, which device directly senses the actual height of the cargo above the drop-zone terrain rather than by an indirect measurement such as barometric pressure. Additionally, it is highly desirable to provide such a parachute-opening device which is of very rugged and simple construction, allowing its assembly, storage and use by less highly trained personnel.

Accordingly, it is an object of the present invention to provide a system and apparatus for opening or deploying a parachute at a relatively low distance above the drop-zone terrain;

Another object of the invention is the provision of means and apparatus for opening a cargo parachute which directly senses the distance above the drop-zone terrain rather than depending upon indirect measurement thereof as by barometric devices;

A still further object of the invention is the provision of apparatus for carrying out the aforestated objectives which is simple and of rugged construction;

Yet another object of the invention is the provision of such means and apparatus which can be conveniently transported, stored, assembled and used by less highly trained personnel;

A still further object of the invention is the provision of apparatus and systems for opening a cargo parachute at a relatively very low distance above the drop-zone terrain which are highly reliable yet relatively inexpensive;

Other, further and more specific objects and advantages of the invention herein disclosed will become apparent to those skilled in the art from the following description of the invention taken in conjunction with the drawings in which:

FIG. 1 is an exploded perspective view of the weighted ground-contacting foot and associated receptacle for storing the suspending line;

FIG. 2 is a perspective exterior view of the time-delay arming switch and reef cutter assembly;

FIG. 3 is a perspective view of the tension-sensitive switch which activates the reef cutter;

FIG. 4 is a cross-sectional view of the assembly of FIG. 2 showing the internal arrangement of the parts thereof;

FIG. 5 is a sectional view of the ground-contacting foot and cord storage chamber shown in readiness for deployment;

FIG. 6 shows the method of attachment of the arming switch-reef cutter assembly to the skirt of a parachute;

FIG. 7 shows the tension-sensitive switch and ground-contacting foot assembly prior to full deployment;

FIG. 8 shows the descent attitude of a cargo bundle, reefed parachute and the opening assembly deployed just prior to activation;

FIG. 9 shows the descent attitude of a cargo bundle provided with a stabilizing chute and showing the components of the activation system in deployment preparatory to opening the main chute;

FIG. 10 shows the cargo just prior to impact after the activation assembly has opened the main chute.

The aforestated objects and advantages of my invention are attained by the provision of an apparatus for opening a cargo parachute at a predetermined, relatively low distance above the drop-zone terrain, said apparatus comprising in combination: elevation-sensing means responsive to said predetermined distance; signaling means for generating an activating signal, responsive, when armed, to the elevation-sensing means; arming means for arming the signaling means after the cargo is dropped and before the elevation-sensing means senses the predetermined elevation; and parachute-opening means responsive to said activating signal to open the parachute at the predetermined elevation.

Referring to the drawings for a more detailed description of the embodiments chosen for purposes of illustration, FIG. 1 depicts the elements of the presently preferred elevation-sensing means comprising a weighted ground-contacting foot 1 which may be fabricated of any suitable material, for example, lead, steel or the like. A cord 2 of a length substantially equal to the desired predetermined, relatively low distance is attached to the ground-contacting foot and, prior to use, the cord is coiled within a hollow cylindrical member 3 which is integrally affixed to the ground-contacting foot by sliding it over the cylindrical shoulder 4 of the ground-contacting foot and threading a machine screw 5 through a hole 6 in the cylindrical member which registers with a threaded hole 7 in the ground-contacting foot which receives the metal screw.

FIG. 3 shows a preferred signaling means comprising a tension-sensitive switch. The switch comprises a flexible base member 31, suitably constructed of webbing, for example, one inch Type I nylon webbing. A pair of electrical contacts 32 are affixed at spaced locations on the base member, suitably by riveting or sewing. An elastic band 33 is sewn to the base member in such manner as to urge the spaced electrical contacts together. A pair of lead wires 34 are attached to one end of the base member 31 by means of a compressible metal sleeve 35 and the ends of the lead wires are each respectively soldered to one of the electrical contacts as shown at points 36 and 36a. The end of the base member opposite the end to which the lead wires are affixed is folded over and sewn to form a loop, generally indicated by reference numeral 37. When tension is applied in the directions of the arrows A, the elastic member is stretched and the electrical contacts are spaced apart as shown in FIG. 3. Upon the substantial loss of tension, the elastic member 33 causes the base member to flex in the area between the spaced-apart electrical contacts 32, allowing the said contacts to touch, thus completing an electrical circuit through the lead wires 34. This particular construction for the tension-sensitive switch of the apparatus of the invention has been found to be particularly rugged and reliable, although of very simple and economical construction.

FIG. 2 is an external perspective view of the presently preferred apparatus embodying both the parachute opening means and the arming means. A pair of fuse igniters 21, suitably of the type designated "M-2," initiate the burning of a pair of time-delay fuses 22. The fuses are prepared from a so-called "M-700" fuse, cut to burn approximately 16.5 seconds at sea level, although this time can be varied somewhat to suit the conditions encountered. The fuse igniter-fuse assembly is replicated as shown for purposes of reliability. At the end of the fuse-burning period, a safety cord 23, suitably fabricated of 100 pound-test nylon line is severed by the burning fuses to release a spring-loaded assembly (shown in more detail in FIG. 4), thus arming the device. Thus, when the activating signal is received through electrical leads 24, a pyrotechnic charge contained within the device of FIG. 2 is fired, thereby operating the parachute-opening means which, in a preferred embodiment, as shown in FIG. 2, comprises a reef line cutter assembly generally indicated by reference numeral 25.

The apparatus of FIG. 2 is shown in cross section in FIG. 4. The apparatus comprises a generally elongate hollow cylindrical casing 41, suitably fabricated of aluminum or like material. The electrical leads 24 from the tension-sensitive switch of FIG. 3 are received in a wire support plug 42 fabricated of a suitable non-conducting material such as plastic, wood or the like. One of the leads 24 is received in a hole 43 drilled through the wire support plug and is bent backwardly as shown in FIG. 4 into electrical contact with the casing in the area generally indicated by reference numeral 44. The other electrical lead 24 is received in a central hole 44a of the wire support plug and is embedded by crimping and soldering to a brass eyelet 45. The wire support plug 42 is secured within the casing 41 by means of a rivet 46 through the casing.

A sliding piston member 47 is disposed within the casing 41 as shown in FIG. 4. A compression spring 48 urges the piston member 47 away from the wire support plug 42. The spring 48, fabricated of an electrical conducting material, provides an electrical circuit connection between the brass eyelet 45 and a bolt-nut washer assembly, generally indicated by reference numeral 49, carried in the sliding piston 47. Prior to arming, the piston member 47 is retracted against the action of the spring 48 by means of the safety cord 23 which passes through the wire support plug 42, through the sliding piston 47 and is knotted in a recessed portion 47a in the face of the sliding piston member 47.

A battery 101, for example, an ordinary 1½ volt dry-cell flashlight battery, is slidably disposed within the casing 41 and is free to move in the directions indicated by the arrow B. A stationary plug 102 is disposed within the casing 41 to support an electrical contact 103. Prior to the arming of the device by burning the safety cord 23, the battery 101 is free to slide within the casing as shown in FIG. 4 such that the battery contacts only one of the terminals 49 and 103, but never both of them simultaneously.

The parachute-opening means as shown in the presently preferred embodiment in FIG. 4 is a conventional reef line cutter comprising a cutter plug 104 received in the casing 41 and secured by a rivet 105. An explosive charge 106 is positioned within the cutter plug and is provided with electrical leads, one of which 107 is led through a hole 108 in the cutter plug and bent backwardly as shown to contact the casing 41. The other electrical lead 109 extends through a central opening in the plug 102 and is wrapped around the electrical contact 103. The reef line cutter case 110 screws onto the threaded cutter plug 104 and contains a cutter piston 111 slidably disposed within the cutter case. Upon firing of the explosive charge 106, the cutter piston 111 moves in the direction of the arrow C to sever a cord passing through the openings 112 in the cutter case.

In operation, the device of FIG. 4 functions as follows. The safety pins 113 of the fuse igniters 21 are pulled, igniting the fuses 22 which, in turn, burn to sever the safety cord 23. Upon severance of the safety cord 23, the spring 48 urges the sliding piston 47 in the direction of the arrow D, thus forcing the battery 101 into contact with the terminals 103 and 49. This forms a series electrical connection between the battery 101, the explosive charge 106 of the reef line cutter and the leads of the sensing switch 24, thus arming the device preparatory to firing.

The ground-contacting foot assembly of FIG. 1 is shown in assembled condition prior to deployment in FIG. 5. The ground-contacting foot and cord storage cylinder 3 are shown in assembled condition. The length of cord 2 generally corresponding to the desired predetermined distance is coiled within the storage cylinder and secured lightly by an easily ruptured material 9 such as, for example, common masking tape. When used, according to a presently preferred embodiment of the invention, to cause the full deployment of a reefed parachute, the apparatus of FIG. 5 is installed as shown in FIG. 6. The arming switch-reef cutter assembly, generally indicated by reference numeral 61, is received in a pocket 62 sewn to the skirt of the parachute 63. The reef line 64 passes through the openings 112 of the reef line cutter and, until severed, maintains the parachute in a reefed condition as generally indicated in FIG. 8. The electrical leads 24 from the arming switch-reef cutter assembly to the sensing switch are taped at spaced intervals to a suspending line 65, the other end of which is secured in the sleeve 35 of the tension-sensitive switch of FIG. 3. The fuse pull cord 66 is attached to any shroud line of the parachute which is located in the second "stow" from the canopy skirt when the parachute is folded. In this manner, the safety pins will be pulled upon the initial partial deployment of the parachute to the reefed condition.

FIG. 7 is an external view of the tension-sensitive switch of FIG. 3 and the elevation-sensing assembly of FIG. 5 as assembled prior to dropping the cargo from the aircraft. The upper end 71 of the suspension cord is fixed to the lower end 72 of the tension-sensitive switch generally indicated by reference numeral 73. The suspension cord is temporarily secured to the storage cylinder 74 of the ground-contacting foot assembly by wrapping a piece of easily rupturing tape 75 such as the ordinary masking tape which is also used to temporarily close the end of the cord storage cylinder 76.

In operation, the elements hereabove described are assembled and utilized as follows.

Referring to FIG. 8, after the load is ejected from the aircraft, the chute 81 is opened to a reefed condition by any convenient means such as, for example, the use of a rip cord attached to the aircraft. As the chute opens to the reefed condition as shown in FIG. 8, the safety pins (113 in FIG. 4) are pulled, activating the fuse igniters 21 and time-delay fuses 22. Meanwhile, the ground-contacting foot assembly 82 drops below the load on its suspending cord 2, thereby opening the tension-sensitive switch 83 (switch shown in detail in FIG. 3). This deployment of the ground-contacting foot assembly and opening of the tension-sensitive switch will normally take place in from about 7–10 seconds after discharge of the load from the aircraft. As the time-delay fuses 22 burn and sever the safety cord 23 (see FIGS. 2 and 4), the arming device 84 is actuated, thus enabling the reef line cutter to perform its function upon closure of the tension-sensitive switch 83.

FIG. 10 shows the further operation of the apparatus as the ground-contacting foot contacts the drop-zone terrain. As the ground-contacting foot 1 contacts the drop-zone terrain, the tension in the suspending cord 2 is substantially released, thereby allowing the tension-sensitive switch 83 to close, firing the explosive charge of the reef line cutter 84, severing the reef line and allowing the parachute to become fully inflated.

Another technique employing substantially the embodiments of the present invention is illustrated in FIG. 9. In this technique, a small "drag" chute 91 is deployed as the cargo is ejected from the aircraft, simultaneously pulling the safety pins of the arming device 92 and deploying the foot assembly 1, the suspending cord 2 and the tension-sensitive switch 83. When the foot assembly contacts the drop-zone terrain, the tension-sensitive switch 83 closes, firing the reef line cutter to sever the cord 93, whereupon the parachute pulls the main parachute from its pack 94 for more or less immediate full deployment.

The arming switch assembly shown and described hereabove is also useful in connection with other systems where a circuit which generates an activating signal must be deactivated for a predetermined length of time and then armed, enabling the generation of the activating signal upon the closing of a sensing switch in response to an external stimulus. Also, the tension-sensitive switch hereabove described is also useful in connection with other systems wherein it is desired to complete an electrical circuit upon the substantial loss of tension in a flexible member such as a cord, wire or the like.

Having fully described by invention and the presently preferred embodiments thereof, I claim:

1. An apparatus for opening a cargo parachute at a predetermined relatively low distance above the drop zone terrain comprising:
   (a) free falling elevation sensing means responsive to said predetermined distance by direct contact with the drop zone terrain;
   (b) signaling means, for generating an activating signal, responsive, when armed, to said elevation sensing means;
   (c) arming means for arming said signaling means after said cargo is dropped and substantially before said parachute reaches said predetermined distance;
   (d) parachute opening means responsive to said activating signal to open said parachute at said predetermined distance.

2. An apparatus for opening a cargo parachute at a predetermined relatively low distance above the drop zone terrain comprising:
   (a) free falling elevation sensing means reponsive to said predetermined distance comprising a weighted ground sensing foot and tensionable means for suspending said foot a distance generally corresponding to said predetermined distance below said cargo;
   (b) tension sensitive signaling means for generating, when armed, an activating signal in response to the substantial loss of tension in said tensionable means when said ground sensing foot contacts said terrain.
   (c) arming means for arming said signaling means after said cargo is dropped and substantially before said parachute reaches said predetermined distance;
   (d) parachute opening means responsive to said activating signal to open said parachute at said predetermined distance.

3. An apparatus for opening a cargo parachute at a predetermined relatively low distance above the drop zone terrain comprising:
   (a) free falling elevation sensing means responsive to said predetermined distance above said terrain;
   (b) signaling means, for generating an activating signal, responsive, when armed, to said elevation sensing means comprising in series electrical connection
      (i) a first switch means responsive to said elevation sensing means,
      (ii) a second switch means normally open until armed,
      (iii) electrical power means;
   (c) arming means for closing said second switch means after said cargo is dropped and substantially before said parachute reaches said predetermined distance;
   (d) parachute opening means responsive to said activating signal for opening said parachute at said predetermined distance.

4. An apparatus for opening a cargo parachute at a predetermined relatively low distance above the drop zone terrain comprising:
   (a) free falling elevation sensing means responsive to said predetermined distance by direct contact with the drop zone terrain;
   (b) signaling means, for generating an activating signal, responsive to said elevation sensing means including safety means preventing the generation of such signal until said safety means are released;
   (c) arming means comprising
      (i) time delay means actuated substantially at the time said cargo is dropped,
      (ii) safety release means actuated by said time delay means at the end of the delay period thereof to arm said signaling means by releasing said safety means substantially before said parachute reaches said predetermined distance;
   (d) parachute opening means responsive to said activating signal to open said parachute at said predetermined distance.

5. An apparatus for opening a cargo parachute at a predetermined relatively low distance above the drop zone terrain comprising:
   (a) free falling elevation sensing means responsive to said predetermined distance by direct contact with the drop zone terrain;
   (b) signaling means, for generating an activating signal, responsive, when armed, to said elevation sensing means;
   (c) arming means for arming said signaling means after said cargo is dropped and substantially before said parachute reaches said predetermined distance;
(d) parachute opening means to open said parachute at said predetermined distance comprising
  (i) cord means restraining at least the complete deployment of said parachute,
  (ii) cutter means responsive to said actuating signal for severing said cord means to completely deploy said parachute.

6. An apparatus for opening a cargo parachute at a predetermined relatively low distance above the drop zone terrain, comprising:
(a) elevation sensing means responsive to said predetermined distance including
  (i) a weighted ground contacting foot, and
  (ii) a cord for suspending said foot beneath said cargo;
(b) signaling means for generating an electrical activating signal including
  (i) a tension sensitive switch held open by the tension in said cord means when said foot is suspended beneath said cargo and closing in response to the substantial relief of the tension in said cord when said foot contacts the drop zone terrain,
  (ii) an arming switch in series electrical connection with said tension sensitive switch,
  (iii) releasable safety means operatively associated with said arming switch, holding said arming switch open at least until said foot is suspended beneath said cargo thereby opening said tension sensitive switch,
  (iv) means for releasing said safety means to close said arming switch substantially before said parachute reaches said predetermined distance, and
  (v) a source of electrical power in series electrical connection with said tension sensitive switch and said arming switch to provide power for said activating signal; and
(c) parachute opening means responsive to said activating signal to open said parachute at said predetermined distance.

References Cited
UNITED STATES PATENTS

| | | | |
|---|---|---|---|
| 2,560,445 | 7/1951 | Jackson | 244—138 |
| 3,015,463 | 1/1962 | Gross | 244—147 |

MILTON BUCHLER, *Primary Examiner.*

R. A. DORNON, *Assistant Examiner.*